United States Patent
Kim et al.

(10) Patent No.: US 6,806,913 B2
(45) Date of Patent: Oct. 19, 2004

(54) APPARATUS AND METHOD FOR PROCESSING ADDITIONAL INFORMATION IN DATA BROADCAST SYSTEM

(75) Inventors: Joon-Hwan Kim, Seoul (KR); Pil-Sang Ju, Suwon-si (KR); Young-Hwan Pan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 09/984,984

(22) Filed: Oct. 31, 2001

(65) Prior Publication Data

US 2002/0129365 A1 Sep. 12, 2002

(30) Foreign Application Priority Data

Mar. 9, 2001 (KR) ......................................... 2001-12243

(51) Int. Cl.⁷ .............................................. H04N 5/445
(52) U.S. Cl. ........................ 348/563; 348/564; 348/473
(58) Field of Search ................................ 348/465, 563, 348/564, 559, 553, 468, 473, 474; 725/40, 41, 39, 38; H04N 5/445

(56) References Cited

U.S. PATENT DOCUMENTS

| | | | |
|---|---|---|---|
| 5,936,679 A | * | 8/1999 | Kasahara et al. ............ 348/553 |
| 6,035,304 A | * | 3/2000 | Machida et al. .......... 707/104.1 |
| 6,229,541 B1 | * | 5/2001 | Kamen et al. ............... 345/719 |
| 6,335,763 B1 | * | 1/2002 | Nishio et al. ................ 348/564 |
| 6,411,725 B1 | * | 6/2002 | Rhoads ........................ 382/100 |

FOREIGN PATENT DOCUMENTS

KR 2000-0037294 7/2000

OTHER PUBLICATIONS

"Notice of the reason of rejection" issued by Korean Industrial Property Office dated on Oct. 29, 2002.
English language Abstract and computer translated disclosure of JP10–145694 to Kitahara, published on May 29, 1998.

* cited by examiner

Primary Examiner—Michael H. Lee
(74) Attorney, Agent, or Firm—Robert E. Bushnell, Esq.

(57) ABSTRACT

In an apparatus and method for processing a data broadcast signal, additional information contained in a TV broadcast signal can be easily selected and acquired without a time limit by using a still picture. Additional information corresponding to the still picture from additional information transmitted in real time with a moving picture broadcast program is processed, and the additional information is stored, together with still picture information matched with the additional information, so that an object of the additional information included in the moving picture or a picture swiftly changing can be accurately selected from the still picture without a time limit. As a result, additional information corresponding to the selected object is easily acquired. In addition, additional information can be easily searched using still pictures corresponding to additional information stored in a memory.

17 Claims, 4 Drawing Sheets

APPARATUS AND METHOD FOR PROCESSING ADDITIONAL INFORMATION IN DATA BROADCAST SYSTEM

CLAIM OF PRIORITY

This application makes reference to, incorporates the same herein, and claims all benefits accruing under 35 U.S.C. §119 from my application APPARATUS AND METHOD FOR PROCESSING AN ADDING INFORMATION IN THE DATA BROADCASTING SYSTEM filed with the Korean Industrial Property Office on Mar. 9, 2001 and there duly assigned Serial No. 12243/2001.

BACKGROUND OF THE INVENTION

1. Technical Field

The present invention relates to an apparatus and method for processing a data broadcast signal and, more particularly, to an additional information processing apparatus and method for easily selecting and acquiring additional information contained in a television (TV) broadcast signal in a data broadcast system without a time limit by using a still picture.

2. Related Art

As data processing technology develops, a TV station transmits various types of additional information, including general information on TV programs, in addition to video and audio signals. A TV receiver receives the additional information, and acquires the additional information according to a TV viewer's selection.

For such data broadcasts in an analog broadcast system, the additional information is embedded in a predetermined horizontal synchronizing signal section, which does not have any influence on the picture being displayed, and is then transmitted. Accordingly, there is a limit to the amount of additional information which can be transmitted. Consequently, various information services cannot be provided. However, as digital broadcast systems have developed, a large amount of additional information that TV viewers can conveniently use can be provided. Accordingly, additional information tends to vary in type, such as education, game and on-line commerce information, as well as general program information.

Such an additional information processing technique in data broadcasting is disclosed in U.S. Pat. No. 6,035,304 to Machida et al., entitled SYSTEM FOR STORING AND PLAYING A MULTIMEDIA APPLICATION ADDING VARIETY OF SERUICES SPECIFIC THERETO, issued on Mar. 7, 2000 and Japanese Patent Publication No. hei 10-145694 to Kitahara, entitled MANAGING SYSTEM FOR BROADCASTING DATA INFORMATION, published on May 29, 1998. Machida et al. '304 discloses a technique for storing application packages distributed by a broadcast station in a hard disc drive of multimedia within a TV, and selecting and executing one of the stored application packages at any time to utilize information added to a broadcast signal. Kitahara '694 discloses a technique for receiving broadcast data information, and acquiring and storing only data information corresponding to an item selected by a user, thereby executing a response of the data information, even after the end of the program.

However, according to such conventional technology, when a large amount of additional information is transmitted, a large capacity storage medium is required to store and utilize the additional information transmitted. Accordingly, technology for acquiring additional information without installing a large capacity storage medium onto a TV has been developed. However, according to such conventional technology, the subject matter of the additional information must be directly selected by moving a cursor to the location of the subject on a screen of a moving picture transmitted in real time. Accordingly, when the subject of the additional information is dynamic, or when additional information is contained in a rapidly changing image, a user is pressed for time in selecting the subject of additional information so that it is difficult for the user to accurately select desirable additional information.

SUMMARY OF THE INVENTION

To solve the above problems, it is a first object of the present invention to provide an additional information processing method for holding a picture, with respect to which additional information included in a broadcast signal is to be used, and selecting additional information related to the held picture without a time limit on acquisition of the additional information in a data broadcast system.

It is a second object of the present invention to provide an additional information processing apparatus for holding a picture, with respect to which additional information included in a broadcast signal is to be used, and selecting additional information related to the held picture without a time limit on acquisition of the additional information in a data broadcast system.

Accordingly, to achieve the first object of the invention, there is provided a method of processing additional information included in a broadcast signal in a data broadcast system. The method includes the steps of: (a) determining whether the additional information exists in the broadcast signal currently being received, and displaying on a screen an additional information reception display image corresponding to the result of the determination; (b) determining whether an additional information acquisition command is inputted while a picture including the additional information is displayed on the screen; (c) editing at least a still picture and an additional information picture on one screen, thereby generating an additional information guide screen, when it is determined that the additional information acquisition command is inputted in step (b), the still picture being obtained at a moment when the additional information acquisition command is inputted, the additional information picture corresponding to an object selected from the still picture; and (d) performing additional information processing corresponding to a command input through the additional information guide screen.

To achieve the second object of the invention, there is provided an apparatus for processing additional information included in a broadcast signal in a data broadcasting system. The apparatus includes: a demultiplexer for separating video data, audio data and the additional information from a channel decoded broadcasting signal; a controller for receiving the additional information separated by the demultiplexer, for generating an additional information reception display control signal when a picture including the additional information is displayed, for generating a control signal so as to provide an edited screen, such as an additional information guide screen, used for acquiring additional information when an additional information acquisition command is inputted, and generating a predetermined control signal corresponding to information input through the additional information guide screen; an image information generator for generating an additional information reception image signal corresponding to the additional information reception display control signals; an additional information processor for decoding the additional information separated by the demultiplexer; a video processor for decoding the video data separated by the demultiplexer; a video editor for receiving the output signal of the image information generator, the output signal of the video processor, and the output signal of the additional information processor, for outputting the additional information reception image signal to a predetermined location on a screen, and for outputting an additional information guide screen on which at least a still picture obtained at the moment when the additional information acquisition command is inputted and an additional information picture corresponding to an object selected from the still picture are edited; and a display unit for displaying a video signal resulting from editing by the video editor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PRESENT INVENTION

Figure 1:
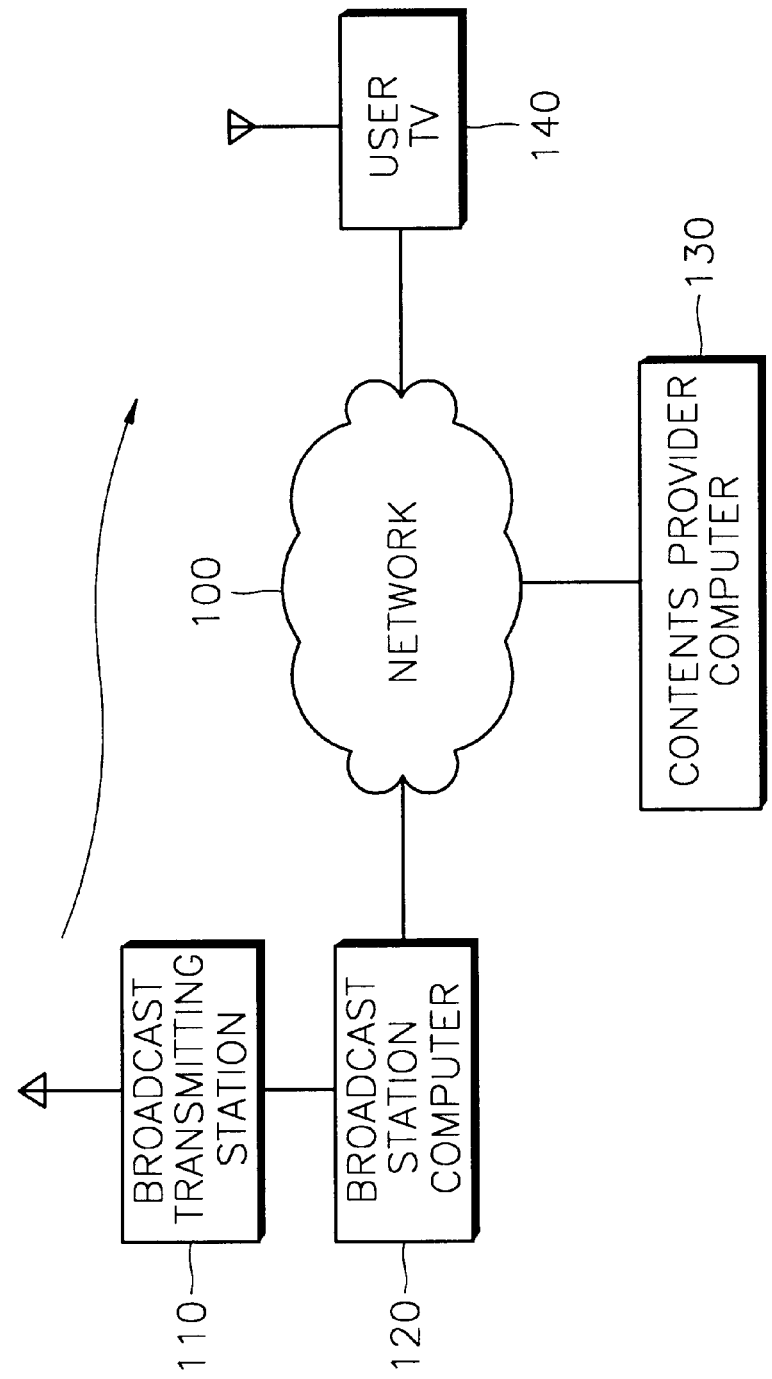
FIG. 1 is a diagram of the configuration of a data broadcast system to which the present invention is applied.

FIG. 1 is a diagram of the configuration of a data broadcast system to which the present invention is applied. Referring to FIG. 1, a data broadcast system to which the present invention is applied includes a network 100, a broadcast transmitting station 110, a broadcast station computer 120, a contents provider computer 130, and a user TV 140.

The network 100 can be realized as the Internet, which is a communications network linking computers throughout the world. In this case, the broadcast station computer 120, the contents provider computer 130 and the user TV 140 are connected to the network 100, and have software and hardware for accessing the Internet so that two-way communications using additional information contained in a TV broadcast program can be accomplished.

The broadcast transmitting station 110 inserts various types of additional information, such as various contents and advertisements which are developed by the broadcast station and contents which are developed by contents providers managing on-line commerce, into the video and audio signals of a program to be broadcast, and transmits the resultant broadcast signal.

The broadcast station computer 120 separately stores additional information by type using a database installed therein. The broadcast station computer 120 includes hardware and software for managing data transmitted from users through the network 100.

The contents provider computer 130 produces contents relating to advertising and on-line commerce, which will be inserted into a broadcast program under a contract with the broadcast station, and transmits the contents to the broadcast station computer 120. The contents provider computer 130 includes hardware and software for managing on-line commerce information transmitted from the network 100.

The user TV 140 extracts additional information contained in the broadcast signal transmitted from the broadcast transmitting station 110, and includes hardware and software for managing detailed information extracted according to a user's selection. The user TV 140 also includes hardware and software for accessing the broadcast station computer 120 and the contents provider computer 130 through the network 100, and for transmitting or receiving information related to the additional information.

Users can selectively acquire and utilize additional information contained in broadcast programs transmitted from a broadcast station in such a data broadcasting system. An additional information processing apparatus for acquiring and utilizing additional information in a user's TV will be now described.

Figure 2:
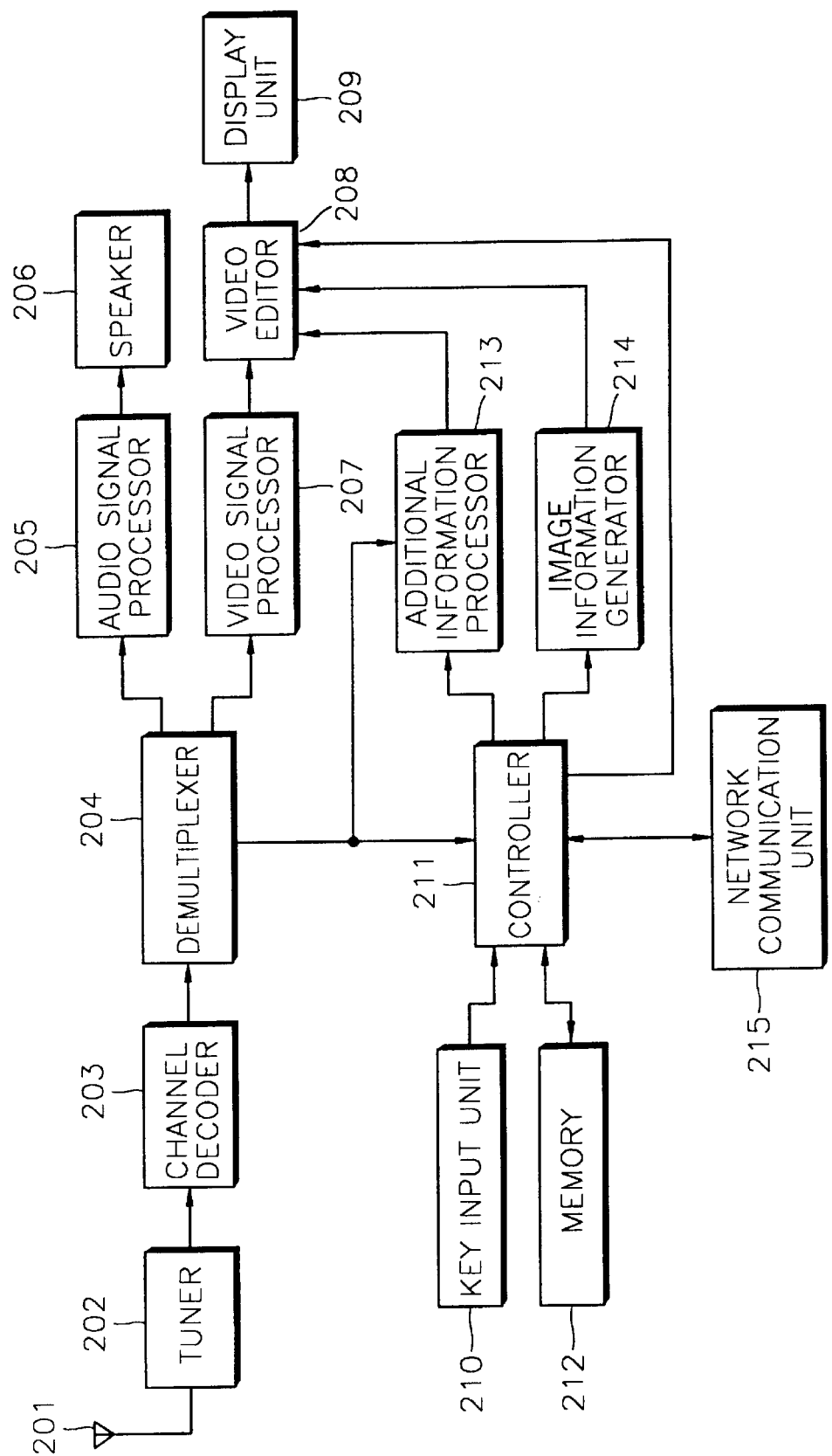
FIG. 2 is a diagram of the configuration of an apparatus for processing additional information in a data broadcast system according to the present invention.

FIG. 2 is a diagram of the configuration of an apparatus for processing additional information in a data broadcast system according to the present invention. As shown in FIG. 2, an additional information processing apparatus for a data broadcast system according to the present invention includes an antenna 201, a tuner 202, a channel decoder 203, a demultiplexer 204, an audio signal processor 205, a speaker 206, a video signal processor 207, a video editor 208, a display unit 209, a key input unit 210, a controller 211, a memory 212, an additional information processor 213, an image information generator 214, and a network communication unit 215.

When a user selects a channel to view after turning on the power to a TV set using a key button in the key input unit 210, the tuner 202 selects and outputs the broadcast signal of the selected channel from the broadcast signals received through the antenna 201. Then, the channel decoder 203 recovers a digital signal detected from the broadcast signal of the selected channel in units of a packet, and outputs the recovered packet data to the demultiplexer 204. The demultiplexer 204 separates the recovered packet data into audio data, video data and additional information data, and outputs the separated data in the form of individual bit streams.

The audio data is subjected to signal processing, such as decoding and error correction, in the audio signal processor 205, and is then outputted through the speaker 206. The video data is subjected to signal processing, such as decoding and error correction, in the video signal processor 207, and is then inputted to the video editor 208. The additional information data is decoded by the additional information processor 213, and is then inputted to the video editor 208.

Once an additional information acquisition command has been received from the key input unit 210, the controller 211 generates an additional information guide screen for acquiring additional information through editing, and controls peripheral circuits, such as the memory 212, the additional information processor 213, the video editor 208 and network communication unit 215, in response to information input through the additional information guide screen.

In addition, when additional information is received, the controller 211 extracts an additional information class code from the additional information, and generates a reception display control signal corresponding to the additional information class code. The additional information class code is inserted into the additional information before broadcast station 110 (FIG. 1) transmits the broadcast signal, and indicates the type of characteristic of the additional information.

The image information generator 214 (FIG. 2) outputs, to video editor 208, an image signal for displaying the type of the received additional information in response to the reception display control signal received from the controller 211.

The video editor 208 inserts the image signal received from the image information generator 214 at a particular location in the video image recovered by the video signal processor 207. This results in display of an image signal presenting the reception state of the additional information on an outer portion of the TV screen.

Accordingly, TV viewers can understand, in real time, that the additional information is being received as a result of viewing the additional information display image signal displayed on the TV screen. When a TV viewer enters an additional information acquisition command through the key input unit 210 in order to acquire additional information while watching a broadcast program, the video editor 208 edits a video signal recovered by the video signal processor 207 and an additional information signal recovered by the additional information processor 213 in response to a control signal generated by the controller 211 which has interpreted the input command, and generates an additional information guide screen as shown in FIG. 4.

Figure 4:
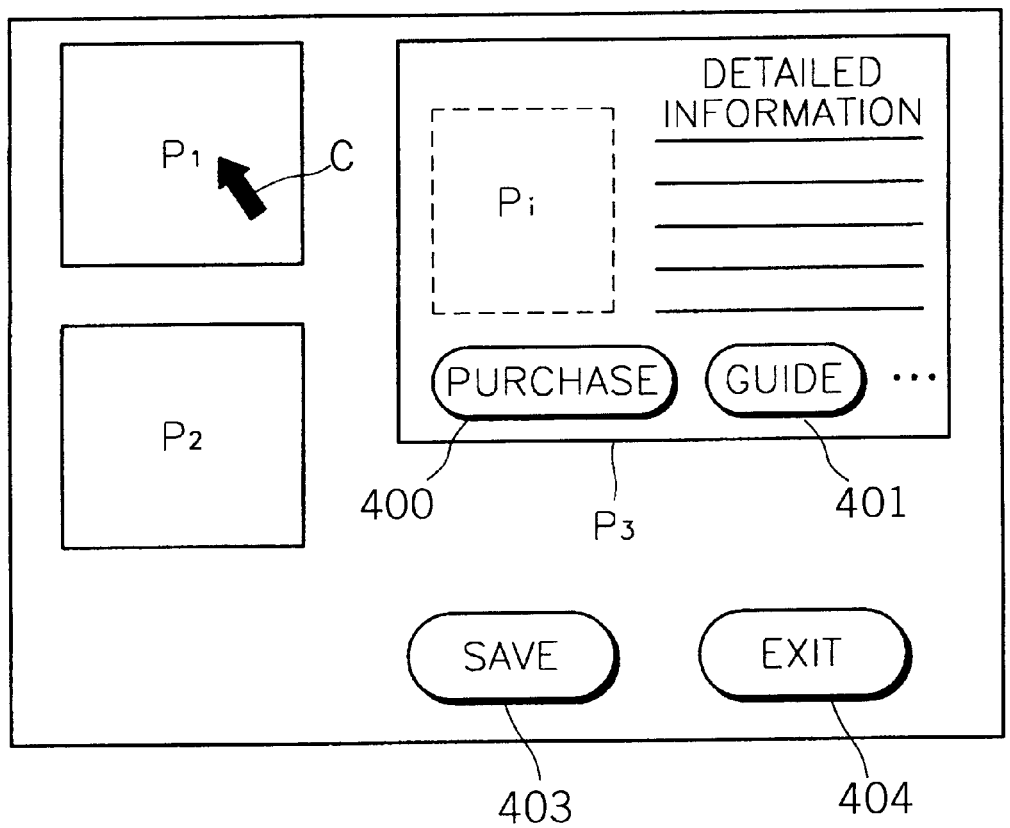
FIG. 4 is a diagram of the configuration of an additional information guide screen edited by the video editor of FIG. 2.

FIG. 4 is a diagram of the configuration of an additional information guide screen edited by the video editor of FIG. 2. The additional information guide screen of FIG. 4 is composed of a still picture $P_1$, at the time when the additional information acquisition command is entered, a broadcast picture $P_2$ received in real time, an additional information picture $P_3$ corresponding to a subject selected by a user, and various input windows.

As for the still picture $P_1$, a subject image for providing additional information is displayed in such a way as to be discriminated from a general image. In addition, a cursor C is displayed to allow a user to select a subject of additional information.

When a user uses the cursor C to select a subject of additional information that he/she wishes to acquire among the subjects of additional information appearing on the still picture $P_1$, the additional information processor 213 decodes additional information, corresponding to the subject selected using the cursor, from the additional information received, and outputs the decoded additional information to the video editor 208. The video editor 208 outputs the image of the additional information received from the additional information processor 213 to the position of the picture $P_3$ on the additional information guide screen of FIG. 4.

The additional information picture $P_3$ is composed of an object image $P_i$ which is the image of the object selected by the user, detailed character information, and a variety of input windows. For example, a purchase input window 400 for on-line commerce, and a guide input window 401 for providing various guiding services related to additional information, are included.

The additional information guide screen includes a save input window 403 for saving the additional information outputted to the additional information picture $P_3$, and an exit input window 404 for terminating the display of the additional information guide screen and turning to a TV mode for displaying a program currently being broadcast.

When the save input window 403 is clicked on the additional information guide screen, the additional information of the object selected from the still picture is saved in the memory 212 together with still picture data corresponding to the additional information.

If the user clicks the purchase input window 400 in the additional information picture $P_3$ on the additional information guide screen, a screen for inputting user information, which is necessary for purchasing a product provided through the additional information, is displayed at the location of the additional information picture P3. Once the user inputs the user information and purchase information to apply for a purchase, the user information and the purchase information are transmitted by the network communication unit 215 through the network 100 to the site of a broadcast station, and to the site of a contents provider providing on-line commerce information as additional information.

The network communication unit 215 includes software and hardware for accessing a communication network such as the Internet. The network communication unit 215 executes an Internet access program in response to information inputted by the user through the additional information picture $P_3$, accesses a site providing the additional information, transmits the information inputted by the user to the site, and receives information transmitted from a computer of the accessed site.

Figure 3:
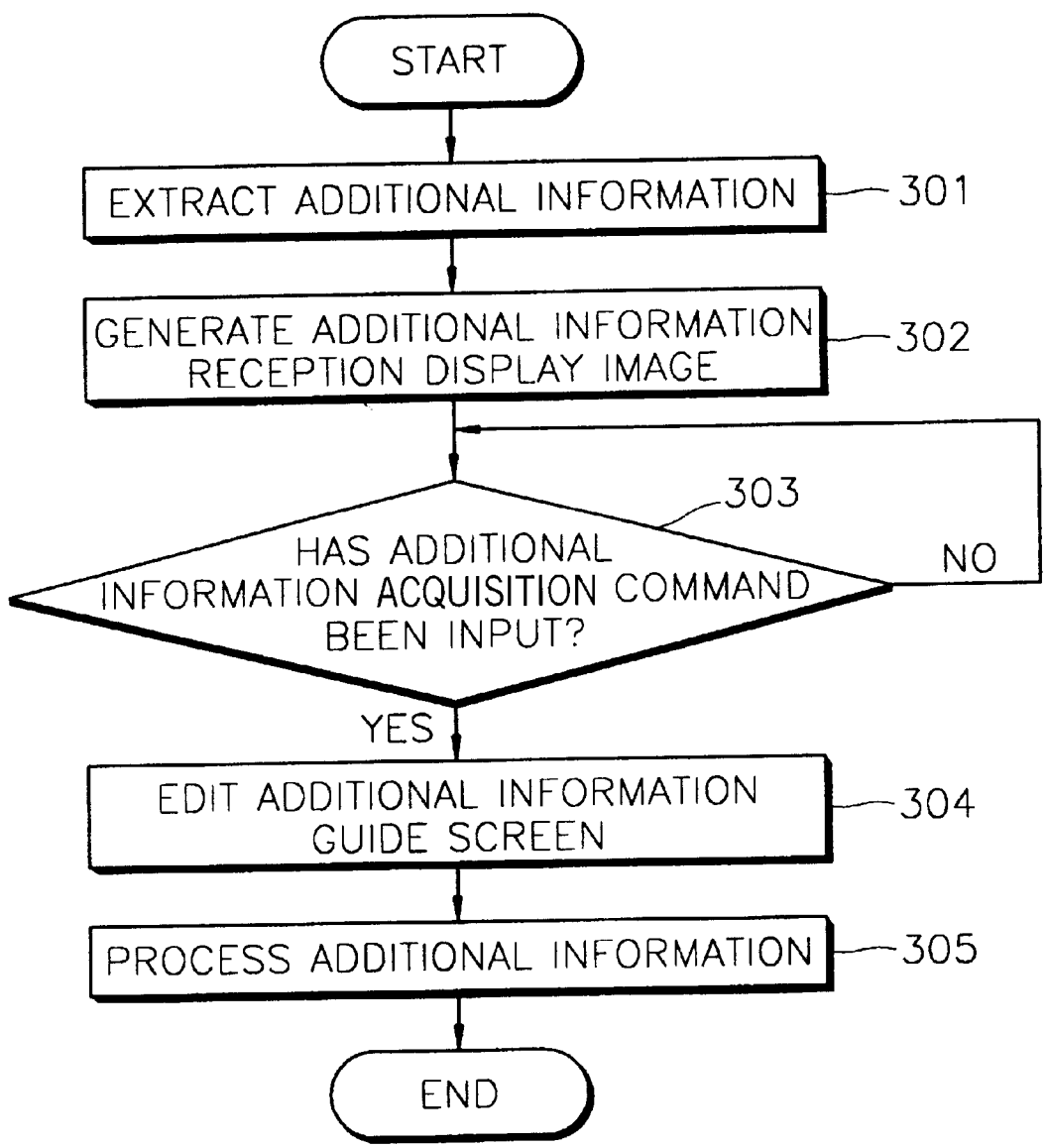
FIG. 3 is a flowchart of a method for processing additional information in a data broadcast system according to the present invention.

A method for processing additional information in a data broadcasting system according to the present invention will be described in detail referring mainly to FIG. 3. In step 301, a broadcast program is received, and additional information is extracted from the broadcast program. The additional information is composed of the various types of contents related to the broadcast program, and includes contents allowing on-line commerce.

Next, when the additional information is extracted from the broadcast program, in step 302, a class code included in the extracted additional information is analyzed, and an additional information reception display image corresponding to the class code is generated and displayed at a particular location on the picture of the broadcast program. This is for the purpose of accurately informing viewers of a broadcast program picture, including additional information in the broadcast program received in real time.

In step 303, it is determined whether an additional information acquisition command is inputted while the broadcast program picture, including the additional information, is being displayed. If the additional information acquisition command is inputted, in step 304, a still picture at the time when the additional information acquisition command is inputted, a broadcast picture received in real time, and an additional information picture corresponding to the still picture are edited on the same screen, thereby generating an additional information guide screen, as shown in FIG. 4.

Next, in step 305, the additional information is processed according to information inputted on the additional information guide screen by a user as follows. When an object for providing detailed additional information on the still picture $P_1$, which is obtained at the moment when the additional information acquisition command is inputted, is clicked, additional information corresponding to the clicked object is processed and displayed as the additional information picture $P_3$. When the save input window 403 is clicked, the additional information corresponding to the additional information picture $P_3$ is saved in a memory (not shown). Still picture data corresponding to the additional information is matched with the additional information, and the still picture data and the matched additional information are saved together in the memory (not shown). When exit input window 404 is clicked, a mode in which a broadcast program picture received in real time is displayed is recovered. When any of various input windows included in the additional information picture $P_3$ is clicked, additional information processing corresponding to the clicked input window is performed. For example, when purchase input window 404 is clicked, a menu screen for on-line commerce is generated, and on-line commerce information inputted by a user is transmitted to the site of the broadcast station 110 and an on-line commerce site through network 100 (FIG. 1).

According to such an apparatus and method, from the additional information transmitted with a moving picture broadcast program in real time, additional information corresponding to a still picture can be easily selected and acquired, or used without a time limit, by using the still picture.

As described above, the present invention processes additional information corresponding to a still picture from the additional information transmitted with a moving picture broadcast program in real time, and stores the additional information together with still picture information matched with the additional information, so that an object of the additional information included in a moving picture or a picture swiftly changing can be accurately selected from the still picture without a time limit, thereby easily acquiring additional information corresponding to the select object. In addition, additional information can be easily searched for using still pictures corresponding to additional information stored in a memory.

The present invention can be realized as a method, an apparatus, a system and the like. When the present invention is realized as software, the components of the present invention are code segments which execute necessary operations. Programs or code segments may be stored in a processor readable medium, or may be transmitted by a transmission medium, or by a computer data signal combined with a carrier in a communication network. The processor readable medium may be any medium, such as an electronic circuit, a semiconductor memory device, a ROM, a flash memory, an $E^2ROM$, a floppy disc, an optical disc, a hard disc, an optical fiber medium, or a radio frequency (RF) network, which can store or transmit information. The computer data signal may be any signal which can be transmitted through a transmission medium, such as an electronic network channel, an optical fiber, air, an electromagnetic field, or a RF network.

Although the invention has been described with reference to particular embodiments, it will be apparent to one of ordinary skill in the art that modifications to the described embodiments may be made without departing from the spirit and scope of the invention. Therefore, it is obvious that the present invention is not restricted to the specific structures or arrangements shown or described in this specification.

What is claimed is:

1. A method of processing additional information included in a broadcast signal in a data broadcast system, the method comprising the steps of:
    (a) determining whether the additional information exists in a broadcast signal currently being received, and displaying on a screen an additional information reception display image corresponding to a result of the determination;
    (b) determining whether an additional information acquisition command is inputted while a picture including the additional information is displayed on the screen;
    (c) editing at least a still picture and an additional information picture on one screen, thereby generating an additional information guide screen, when it is determined that the additional information acquisition command is inputted in step (b), the still picture being obtained at a time when the additional information acquisition command is inputted, the additional information picture corresponding to an object selected from the still picture; and
    (d) performing additional information processing corresponding to a command input through the additional information guide screen.

2. The method of claim 1, wherein the additional information guide screen is constructed by editing, on one screen, the still picture obtained at a time when the additional information acquisition command is inputted, a broadcasting picture received in real time, and the additional information picture corresponding to the still picture.

3. The method of claim 1, wherein the additional information guide screen comprises at least a save input window for saving contents corresponding to additional information corresponding to the object selected from the still picture, and an exit input window for recovering a picture with respect to which the additional information acquisition command was input.

4. The method of claim 3, wherein the additional information guide screen further comprises an on-line commerce input window for applying for on-line purchase when selected additional information is related to on-line commerce.

5. The method of claim 4, wherein purchase information inputted at the on-line commerce input window is transmitted through an Internet to a server of a broadcast station that has transmitted the additional information.

6. The method of claim 4, wherein purchase information inputted on the on-line commerce input window is directly transmitted through an Internet to a site related to a product to be purchased.

7. The method of claim 3, wherein the still picture is matched with the additional information of the object selected from the still picture, and the still picture and the matched additional information are stored together in a memory.

8. The method of claim 1, wherein additional information reception display images are set for different types of additional information.

9. An apparatus for processing additional information included in a broadcast signal in a data broadcasting system, the apparatus comprising:
    a demultiplexer for separating video data, audio data and the additional information from a channel decoded broadcast signal;
    a controller for receiving the additional information separated by the demultiplexer, for generating an additional information reception display control signal when a picture including the additional information is displayed, for generating a control signal for generating an additional information guide screen used for acquiring additional information when an additional information acquisition command is inputted, and for generating a predetermined control signal corresponding to information input through the additional information guide screen;
    an image information generator for generating an additional information reception image signal corresponding to the additional information reception display control signal;

an additional information processor for decoding the additional information separated by the demultiplexer;

a video processor for decoding the video data separated by the demultiplexer;

a video editor for receiving an output signal of the image information generator, an output signal of the video processor, and an output signal of the additional information processor, for outputting the additional information reception image signal to a predetermined location on a screen, and for outputting an additional information guide screen on which at least a still picture obtained at a time when the additional information acquisition command is inputted, and an additional information picture corresponding to an object selected from the still picture is edited; and a display unit for displaying a video signal resulting from editing by the video editor.

10. The apparatus of claim 9, wherein the additional information guide screen is constructed by editing, on one screen, the still picture obtained at a time when the additional information acquisition command is inputted, a broadcasting picture received in real time, and the additional information picture corresponding to the still picture.

11. The apparatus of claim 9, wherein the additional information guide screen comprises at least a save input window for saving contents corresponding to additional information corresponding to the object selected from the still picture, and an exit input window for recovering a picture with respect to which the additional information acquisition command was input.

12. The apparatus of claim 11, wherein the still picture is matched with the additional information corresponding to the object selected from the still picture, and the still picture and the matched additional information are stored together in a memory.

13. The apparatus of claim 9, wherein the additional information guide screen further comprises an on-line commerce input window for applying for on-line purchase when selected additional information is related to on-line commerce.

14. The apparatus of claim 9, further comprising a network communication unit for transmitting information input through an input window on the additional information guide screen through a network to a site having a predetermined address.

15. The apparatus of claim 9, further comprising an audio processor for processing the audio data separated by the demultiplexer, and a speaker for receiving an output signal of the audio processor and producing an audio output.

16. The apparatus of claim 9, further comprising a tuner for receiving and tuning a broadcast signal to produce a tuner output, and a channel decoder for decoding the tuner output to produce the channel decoded broadcast signal.

17. The apparatus of claim 9, further comprising a key input unit operable by a user for entering the additional information acquisition command.

* * * * *